US008152546B2

(12) United States Patent
Gosling et al.

(10) Patent No.: US 8,152,546 B2
(45) Date of Patent: Apr. 10, 2012

(54) MODULAR MULTIPLE-CIRCUIT ELECTRICAL SYSTEM

(75) Inventors: Geoff Gosling, Calgary (CA); Mogens Smed, Dewinton (CA); Steven Van Beveren, Calgary (CA)

(73) Assignee: Dirtt Environmental Solutions, Ltd., Calgary, Alberta (CA)

( * ) Notice: Subject to any disclaimer, the term of this patent is extended or adjusted under 35 U.S.C. 154(b) by 0 days.

(21) Appl. No.: 12/213,134

(22) Filed: Jun. 16, 2008

(65) Prior Publication Data

US 2008/0252147 A1 Oct. 16, 2008

Related U.S. Application Data

(63) Continuation of application No. 11/450,439, filed on Jun. 12, 2006, now Pat. No. 7,387,520.

(60) Provisional application No. 60/689,097, filed on Jun. 10, 2005.

(51) Int. Cl.
*H02R 25/16* (2006.01)

(52) U.S. Cl. ........................................................ 439/215

(58) Field of Classification Search .................. 439/215, 439/151, 516, 211
See application file for complete search history.

(56) References Cited

U.S. PATENT DOCUMENTS

| | | | | |
|---|---|---|---|---|
| 3,426,216 | A * | 2/1969 | Smith et al. | 307/112 |
| 4,384,756 | A * | 5/1983 | Simonovich et al. | 439/53 |
| 4,684,186 | A * | 8/1987 | Hetherington | 439/171 |
| 4,952,164 | A * | 8/1990 | Weber et al. | 439/215 |
| 4,985,806 | A * | 1/1991 | Mazzullo et al. | 361/728 |
| 5,092,787 | A | 3/1992 | Wise et al. | 439/215 |
| 5,096,431 | A | 3/1992 | Byrne | 439/171 |
| 5,096,433 | A | 3/1992 | Boundy | 439/215 |
| 5,158,472 | A * | 10/1992 | Juhlin | 439/215 |
| 5,203,713 | A | 4/1993 | French et al. | 439/215 |
| 5,236,370 | A * | 8/1993 | King et al. | 439/215 |
| 5,562,469 | A | 10/1996 | Nienhuis et al. | 439/215 |
| 6,540,536 | B1 * | 4/2003 | Young | 439/215 |
| 6,575,777 | B2 * | 6/2003 | Henriott et al. | 439/215 |
| 7,183,504 | B2 | 2/2007 | Byrne | |
| 7,294,005 | B1 * | 11/2007 | Laukhuf | 439/215 |
| 7,410,379 | B1 * | 8/2008 | Byrne | 439/215 |
| 7,465,178 | B2 * | 12/2008 | Byrne | 439/215 |

FOREIGN PATENT DOCUMENTS

WO WO 2006/115495 11/2006

* cited by examiner

*Primary Examiner* — Michael Zarroli
(74) *Attorney, Agent, or Firm* — Welsh Flaxman & Gitler LLC

(57) ABSTRACT

A multiple circuit duplex module comprising a chassis having an electrical chassis receptacle providing a plurality of connection points for the selection of power from two or more different circuits; a duplex element having at least one electrical duplex receptacle thereon to deliver power from one of the two or more different circuits to an external device in electrical contact with the at least one duplex receptacle; first conductor means for electrically connecting the at least one duplex receptacle to selected connection points in the chassis receptacle; wherein the duplex element is connectable to the chassis in different orientations, the orientation of the duplex element determining which one of the two or more different circuits is electrically connected to the at least one duplex receptacle.

2 Claims, 5 Drawing Sheets

MODULAR MULTIPLE-CIRCUIT ELECTRICAL SYSTEM

This application claims the benefit of provisional application 60/689,097, filed Jun. 10, 2005 and is a continuation of Ser. No. 11/450,439, filed Jun. 12, 2006 now U.S. Pat. No. 7,387,520.

FIELD OF THE INVENTION

The present application relates to wiring systems, and in particular to an integrated electrical wiring system in which various circuits can be selected.

BACKGROUND

In integrated electrical wiring systems it is desirable to be able to select the circuit being connected to. This allows the configuration of power as required, for example to separate dirty power from utilities from clean power for computer systems. It further allows areas to be zoned by loading specific circuits to certain zones. To change the circuit in traditional point to point wiring systems often involves rewiring or the use of different elements to make proper contact. Modular wiring systems utilizing zone wiring is now the preferred approach to providing the required degree of flexibility in structural wiring in the office environment.

However, current solutions, and particularly zone boxes in present integrated electrical wiring systems, are typically too large for confined areas, such as under low profile floors or in walls.

SUMMARY OF THE INVENTION

The present invention provides a multiple circuit duplex module, whereby in a preferred embodiment any one of four power supply circuits is selected by the orientation of a duplex element in relation to a power supply means main chassis that delivers power to the duplex element. Specifically, the duplex element is detachable from the chassis, and can be rotated to connect back into the chassis in one of four orientations. The orientation of the duplex element determines the selected circuit.

The present invention further provides a compact zone box having a 90 degree circuit dodging function. The box is low profile, allowing installation in compact areas. The box provides a series of main terminal strips and secondary terminal strips, the main terminal strips and secondary terminal strips being perpendicular to each other and connected through connector pins.

This system includes the ability to daisy chain duplex modules in-line. Forcing functions on both the zone box and the duplex modules ensure correct connections at all times.

The present invention therefore provides a multiple circuit duplex module comprising a power supply means in the nature of a chassis having an electrical chassis receptacle providing a plurality of connection points for the selection of power from two or more different circuits; an outlet receptacle block comprising a duplex element having at least one electrical duplex receptacle means thereon to deliver power from one of said two or more different circuits to an external device in electrical contact with said at least one duplex receptacle; first conductor means for electrically connecting said at least one duplex receptacle to selected connection points in said chassis receptacle; wherein said duplex element is connectable to said chassis in different orientations, the orientation of said duplex element determining which one of said two or more different circuits is electrically connected to said at least one duplex receptacle.

The present invention further provides a low profile zone box for distributing electrical power comprising a low profile housing having a longitudinal axis and a transverse axis, a top surface, a bottom surface, spaced apart end surfaces and spaced apart side surfaces, with at least one opening in one of said end surfaces and at least one opening in one of said side surfaces so that said openings are substantially orthogonal to each other; a first set of electrical conductors extending in said housing in the direction of said longitudinal axis, said first set of electrical conductors having first and second ends; at least one second set of electrical conductors extending in said housing in the direction of said transverse axis, said at least one second set of electrical conductors having first and second ends; electrically conductive members connecting respective ones of said first set of conductors to respective ones of said at least one second set of electrical conductors; a first cap member releasably connectable to said at least one opening in said end surface and a second cap member releasably connectable to said at least one opening in said side surface, said first cap member being an electrical connector for connecting said first ends of said first set of electrical conductors to a source of electrical power and said second cap member being an electrical connector for distributing electrical power in said at least one second set of electrical conductors to an external device electrically connected to said second cap member.

The present invention also provides a method for the selection of power from two or more different circuits, said method comprising the steps of providing a chassis with an electrical chassis receptacle having a plurality of connection points therein for the selection of power from said two or more different circuits that are electrically connected to said chassis for the supply of said power thereto; providing a duplex element having at least one electrical duplex receptacle thereon for the delivery of power from one of said two or more electrical circuits to an external device in electrical contact with said at least one receptacle, said duplex element additionally having first conductor means therein for electrical connection to selected connection points in said chassis receptacle, said duplex element being connectable to said chassis in different orientations; and choosing which one of said two or more different circuits is electrically connected to said at least one duplex receptacle by choosing the orientation in which said duplex element is connected to said chassis.

BRIEF DESCRIPTION OF THE DRAWINGS

Preferred embodiments of the present invention will now be described in greater detail and will be better understood when read in conjunction with the following drawings in which.

DETAILED DESCRIPTION OF THE DRAWINGS

Figure 1:
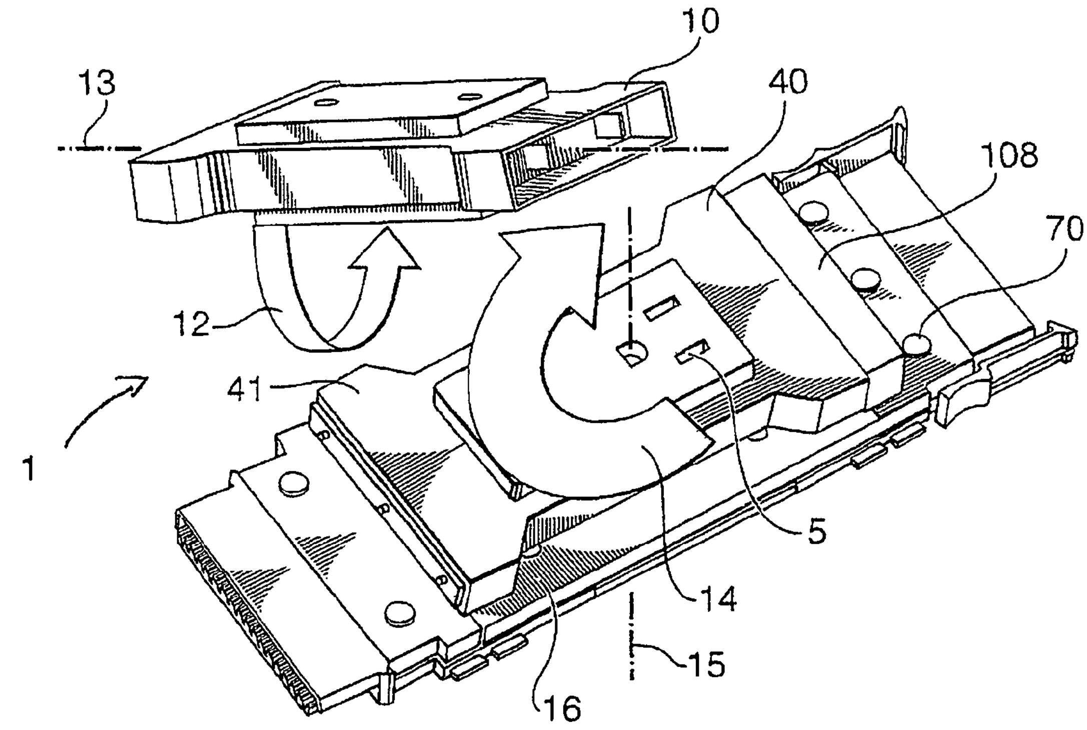
FIG. 1 shows a perspective view of a multiple-circuit duplex module with the duplex element both off chassis and on chassis.

FIG. 1 illustrates an integrated electrical wiring system, comprising a multiple-circuit duplex module 1, wherein any-one of four circuits is selected by the orientation of an outlet receptacle block comprising a duplex element 10 in relation to a power supply means which comprises a main chassis 16. Specifically, as seen in FIG. 1, duplex element 10 can be oriented in anyone of four positions. As illustrated by arrows 12 and 14, duplex element 10 can be rotated about either of axes 13 or 15 and then connected to chassis 16.

Figure 2:
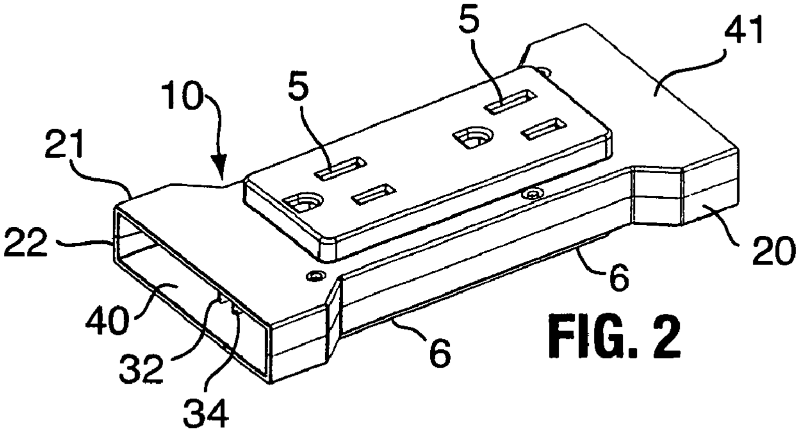
FIG. 2 is a perspective view of the duplex element which forms part of the duplex module shown in FIG. 1.

Duplex element 10 seen most clearly in FIG. 2 is essentially a four outlet electrical receptacle. The duplex element 10 includes receptacle means, wherein the receptacle means are outlets 5 and outlets 6. In particular, the duplex element 10 has two outlets 5 on one side and two more outlets 6 on the other. Turning it end to end with outlets 5 still facing upward for connection to the chassis at one or the other of its ends allows the selection of two different power supply circuits from chassis 16. Flipping it over so that outlets 6 are now facing upwards and again turning it end to end allows the selection of another two different power supply circuits when the duplex element is connected to the chassis.

Figure 3:
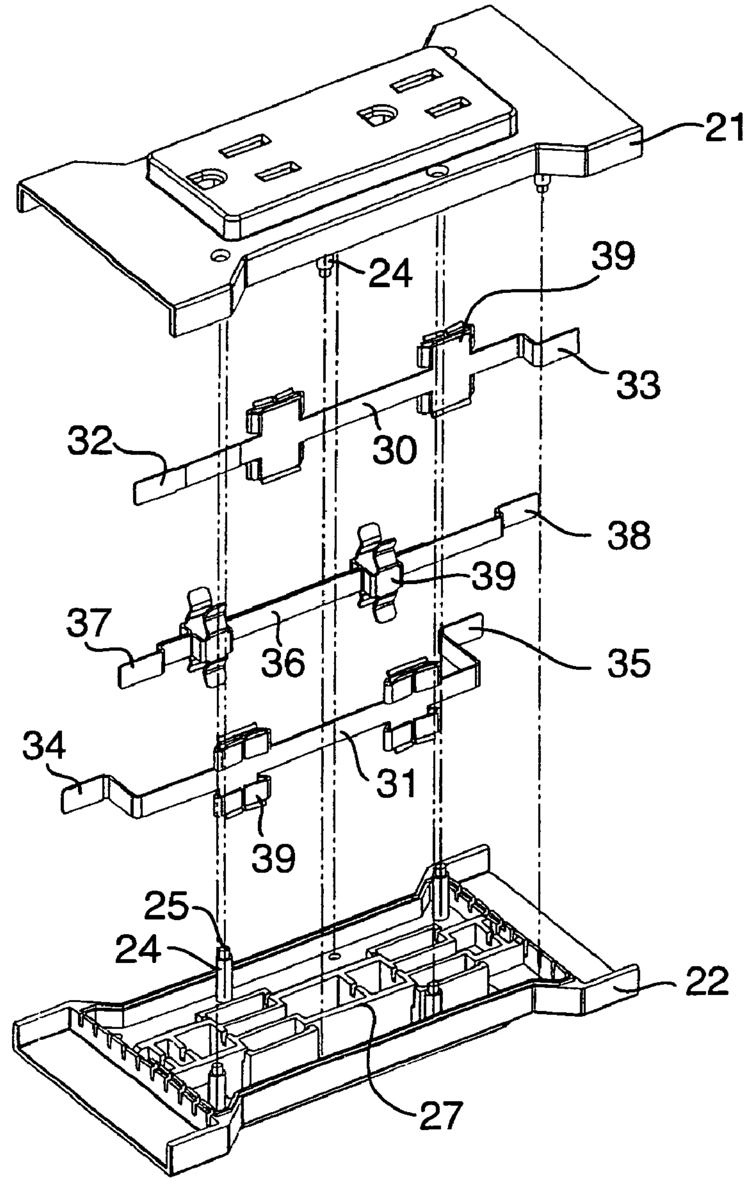
FIG. 3 is a perspective exploded view of the duplex element of FIG. 2.

With specific reference to FIGS. 2 and 3, duplex element 10 generally comprises a housing 20 split into upper and lower halves 21 and 22 that are connected together such as by means of posts 24 having reduced diameter ends 25 that can be melt "welded" to seal the two halves together. As seen most clearly in FIG. 3, each half of the housing is preferably segmented by partitions 27 that enclose and separate a receptacle connector set comprising a pair of conductive terminal strips 30 and 31 that deliver power to outlets 5 and 6 and a common conductive grounding strip 36 for all four outlets. Strips 30 and 31 terminate at prongs 32 and 33 and 34 and 35 respectively. When the two halves of the duplex housing are assembled together, prongs 32 and 34 and 33 and 35 are partially enclosed within housing ends 40 and 41 which respectively are identical to each other in their dimensions. Ends 40 and 41 are also vertically and horizontally symmetrical thereby allowing rotation of duplex element 10 about axes 13 and 15 while maintaining the ability to connect the duplex element in any of its four orientations with chassis 16 as will be discussed below.

As best seen in FIGS. 1 and 3, each of prongs 32, 33, 34 and 35 is laterally displaced by a different amount relative to the longitudinal axis of strips 30 and 31 respectively. Prongs 37 and 38 at the ends of grounding strip 36 are also laterally displaced from the longitudinal axis of the grounding strip in opposite directions but by an equal amount to each side.

As mentioned above, the orientation of duplex 10 defines the circuit selected. As there are four possible orientations for the duplex element, four choices of circuit are possible. Prongs 32 and 34 or 33 and 35 plug into a receptacle on chassis 16 as will be described below. As will be appreciated by the person skilled in the art, the differential displacement of the prongs from axis 13 will determine where contact is made. Further, by having a different displacement for each of prongs 32 and 33 and each of prongs 34 and 35, with no offset for any one of the prongs being the same, turning the duplex end to end, and then flipping it over and again turning it end for end will result in four different pairs of circuit contact points with chassis 16.

Each of terminal strips 30 and 31 and 36 are conventionally formed with contacts 39 for electrical connection to the electrical contacts on a plug (not shown) that will be inserted into one or both of the electrical receptacle outlets 5 or 6 on the duplex element that are facing upwardly at any given time.

Figure 4:
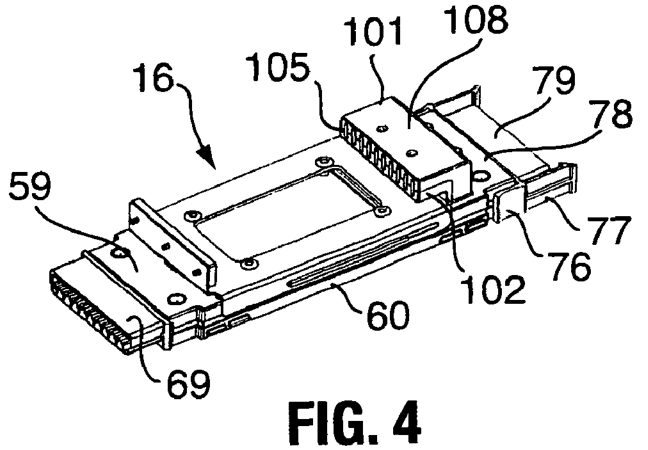
FIG. 4 is a perspective view of the chassis of the duplex module of FIG. 1.

As mentioned above, duplex element 10 connects onto chassis 16 as best seen in FIG. 1. Chassis 16 will now be described in greater detail with reference to FIGS. 4 and 5.

Generally, chassis 16 constitutes the power supply means of the present integrated electrical wiring system. The chassis comprises a housing 60 enclosing ten longitudinally extending conductive terminal strips 90. The use of ten terminal strips correlates to the four different choices of power supply, with four pairs of terminal strips, one pair for each circuit, and two strips for ground connections allowing for utilization of the chassis as the power supply means. A different number of terminal strips can be used, either fewer or greater, depending upon the number of power supply circuits to be made accessible and with suitable changes to the geometry and construction of both the duplex element and the chassis. For example, if the choice of only two circuits is required, the number of terminal strips 90 can be reduced to six, four live and two ground, and duplex element 10 can have one or more receptacles 5 or 6 on just one of its sides, so that its only turned end for end to select one of the two available circuits. Or it might have prongs exposed in only one of ends 40 or 41 so that its only flipped over to select a circuit.

The construction of housing 60 will be self-evident to the person skilled in the art from the drawings and it will therefore be described in terms of its main details only.

Housing 60 generally comprises an upper plate 61 and a lower plate 62 that can be "welded" together by means of posts 63 that can be melted to form the weld. Lower plate 62 includes nine partitions 67 that enclose and separate terminal strips 90.

Terminal strips 90 include incoming power supply connector means such as male connectors 91 at one end enclosed within a first end cap 69 that snap fits into end 59 of housing 60 by means of circular pins 70 that engage circular holes 56 in plates 61 and 62. Male connectors 91 will connect to the female connectors (not shown) in an adaptor that can be plugged into end cap 69 to supply power to the chassis.

Terminal strips 90 include another set of male connectors 93 at their opposite ends that engage a corresponding number of female connectors 95 enclosed within a second end cap 79 that snap fits into end 78 of housing 60 by means of circular pins 70 that engage circular holes 58 in plates 61 and 62. Female connectors 95 will engage the male connectors 91 in a second chassis 16 that can be connected in line with a previous chassis to form a chain of chassis of any desired length.

Terminal strips 90 additionally include a set of orthogonally extending male connectors 96 in electrical contact with a corresponding number of female connectors 99 arranged parallel to main terminal strips 90. Connectors 96 and 99 are enclosed and separated by means of an L-shaped extension 101 on upper plate 61 and a partitioning block 102 that meets with the extension as shown most clearly in FIG. 4. Posts 103 on block 102 are used to "weld" the block and extension together. When the two components are welded together, female connectors 99 are accessible through a series of slots 105 for electrical contact with prongs 32 and 34 or 33 and 35 on duplex element 10 depending upon which end of the duplex is plugged into the chassis. Chassis 16 therefore acts as a junction box to deliver power that comes into the chassis to the prongs 32 and 34 and 33 and 35 on duplex element 10.

When extension 101 and block 102 are connected together, they form a receptacle 108 sized to fit into either of ends 40 or 41 of duplex element 10 as best seen in FIG. 1. When the duplex is plugged into the chassis as shown, the connection of prongs 32 and 34 or 33 and 35 to female connectors 99 is safely enclosed within ends 40 or 41 of the duplex element.

Figure 5:
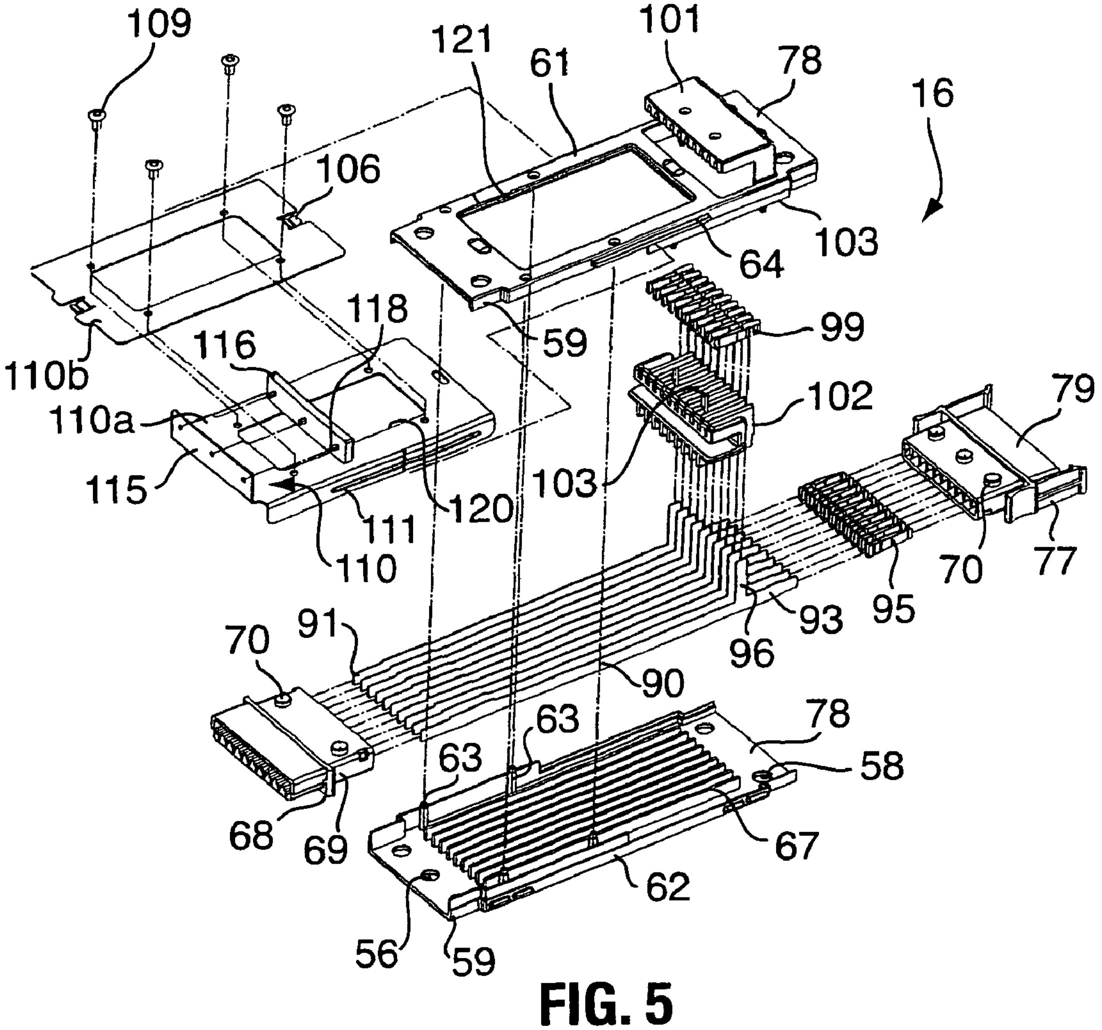
FIG. 5 is an exploded view of the chassis of FIG. 4.

To maintain a positive connection of the duplex element 10 to the chassis 16, and to safely cover the unused prongs at the opposite end of the duplex element 10, chassis housing 60 includes a sliding plate 110 that fits over and slidingly engages the housing's top plate 61. Plate 61 includes on its sides a pair of longitudinally extending flanges or ribs 64. These flanges engage longitudinally extending, correspondingly sized slots 111 in sliding plate 110 as best seen in FIG. 5 which allows the plate to move back and forth relative to the chassis. Plate 110 additionally includes an upwardly extending flange 115 that connects to a non-conductive rectangular plate or cover 116 by means of, for example, pins 118 that can be used to "weld" or snap fit the two components together.

To connect the duplex element 10 to the chassis 16, plate 110 is fully retracted and the duplex element 10 in its chosen orientation is placed onto plate 110, aligning the downwardly facing receptacle surface on the duplex element 10 into correspondingly shaped openings 120 and 121 formed into plates 110 and 61 respectively. The unused end 40 or 41 of the duplex element 10 is pushed over plate 116 to safely close it to prevent accidental contact with the exposed prongs in that end. Plate 110 is then moved towards receptacle 108 so that the other end of the duplex element 10 and the prongs exposed in that end of the duplex's housing will engage selected ones of female connectors 99 depending upon which circuit is to be connected to receptacles 5 or 6 on the upper exposed side of the duplex element 10.

To select another circuit, duplex 10 and plate 110 are moved backwards, on the chassis is moved forwards, to disengage the duplex element from receptacle 108 and the duplex element is then turned end to end or flipped and turned to the selected end and the process is repeated.

If it is desired to connect two or more chassis end to end in a chain, end cap 79 is provided with clips 77 that snap fit onto flanges 68 on end cap 69 of the next chassis for a secure connection. The connection can be broken by pressing on tabs 76 causing the clips to disengage from the flanges.

In a preferred embodiment, sliding plate 110 can be more easily manufactured from two separate plates 110*a* and 110*b* as shown most clearly in FIG. 5. The two plates are connected together such as by means of rivets 109. The lower of the two plates 110*b* can be formed with a pair of spring tabs 106 that space plate 110 from upper chassis housing plate 61 and that facilitate the sliding movement between the two.

In operation, power is supplied to the duplex module 10 by an adaptor (not shown) plugged into end cap 69 of chassis 16 thereby allowing the chassis to function as the power supply means of the present integrated electrical system. The adaptor will supply power from different sources to pairs of the four outermost of terminal strips 90. The two central strips are for ground connections. The different sources of power can be for example relatively "dirty" power from a utility, filtered power, power with different voltages, different frequencies or whatever is required. The power is supplied in a known pattern so that the duplex element 10 can be connected to the chassis 16 in the orientation required to supply the required power to exposed receptacles 5 or 6 through a combination of two of the eight terminal strips 90 that deliver power via prongs 32 and 34 or 33 and 35.

To access a different power supply circuit, the duplex is removed, turned end for end and/or flipped and turned end to end to make the required new connection.

Figure 6:
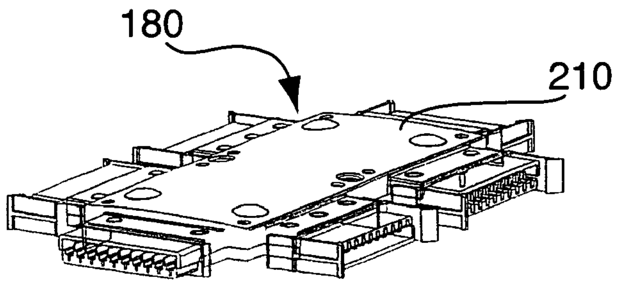
FIG. 6 is a perspective view of a low profile compact zone box.
Figure 8:
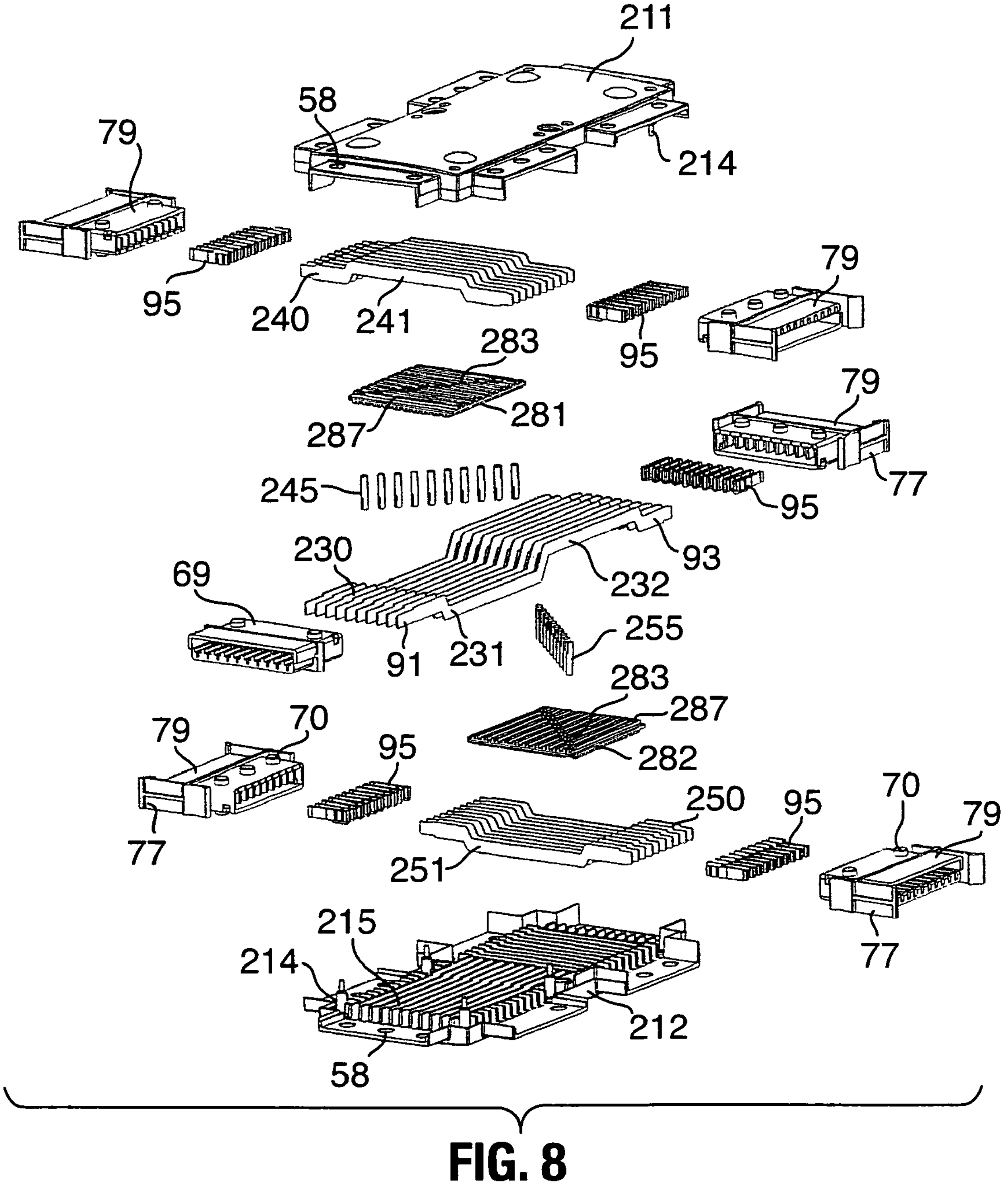
FIG. 8 is a fully exploded view of the zone box of FIG. 7.
Figure 7:
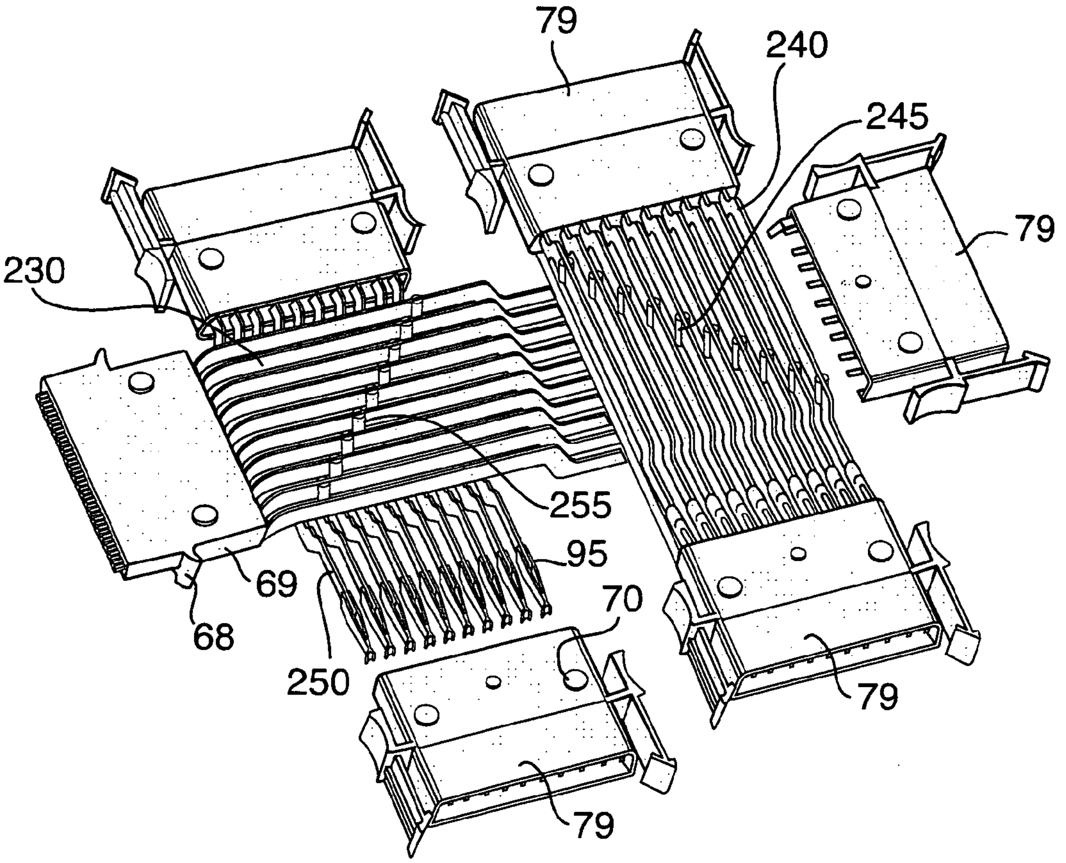
FIG. 7 is a partially exploded perspective view of the zone box of FIG. 6.

The chassis described above can be connected end to end but a different mechanism is needed to connect the chassis at different angles, usually 90°, for distribution of power to different zones. Reference will now be made to FIGS. 6, 7 and 8 which show a compact zone box 180 that can be used for this purpose. The design is low profile and can be located in confined areas too small for other zone boxes, including within low profile floors or within walls. The design is attained using a 90° circuit dodging function best illustrated in FIGS. 7 and 8. Specifically, in the example of these figures, a ten wire, four circuit system is shown which distributes power from one source line to up to five output lines.

In each of FIGS. 6, 7 and 8, like elements have been identified using like numerals.

The zone box is essentially a five way chassis but without the adaptations described above for connection to the duplex element. The zone box includes a housing 210 split into upper and lower halves 211 and 212 that are preferably internally partitioned by dividers 215 to enclose and separate the terminal strips that respectively carry the power to end caps 69 and 79. The upper and lower halves of the housing can be "welded" together by means of posts 214. The caps 69 and 79 connect to the housing in the same manner described above with respect to the chassis by means of circular pins 70 that engage circular holes 58 in the upper and lower plates of housing 210. In both the chassis and the zone box, the use of two pins 70 on one side and three on the other can provide orientation and identification and prevents the caps from being wrongly oriented.

Along its main axis, the zone box is the same as chassis 16 except that each of the ten terminal strips 230 initially dodge down at 231 and then dodge up at 232.

Transverse terminal strips 240 dodge up at 241 to clear dodge down 231 in strips 230. Transverse terminal strips 250 dodge down at 251 to clear dodge up 232 in terminal strips 230. Electrical contact between respective ones of strips 230 and 240 and between strips respective ones of 230 and 250 is provided by means of conductive pins 245 and 255 respectively. Insulating spacers 281 and 282 include holes 283 for pins 245 and 255. The spacers separate and insulate the terminal strips from each other and ridges 287 formed in their upper and lower surfaces assist in maintaining spacing and insulation between each adjacent terminal strip.

Caps 69 and 79 include the same clips and flanges described above with respect to chassis 16 so that the zone box can be securely and directly connected to up to five chassis. Each chassis in turn can be connected to another chassis or indeed to another zone box. More typically, the chassis that are connected to the zone box will be at remote locations and the two will be connected by wire harnesses that clip to caps 69 and 79 in the same manner that caps 69 and 79 can clip directly to each other.

In operation, the zone box is connected to a power supply of up to four different kinds of power and for the ten strip configuration shown in the drawings, four different circuits are supplied to each chassis connected to the zone box to accommodate the four different orientations of the duplex elements that can be plugged into each chassis.

The above-described embodiments of the present invention are meant to be illustrative of preferred embodiments and are not intended to limit the scope of the present invention. Various modifications, which would be readily apparent to one skilled in the art, are intended to be within the scope of the present invention. The only limitations to the scope of the present invention are set forth in the following claims appended hereto.

We claim:

1. A multiple circuit receptacle system, said system comprising:

power supply means for supplying electrical power to said multiple circuit receptacle system, said power supply means supplying said electrical power in the form of a plurality of power supply circuits; and an outlet receptacle block having receptacle circuit means adapted to be electrically connected to selectively interconnected electrical devices, said outlet receptacle block further having receptacle circuit means for electrically and selectively coupling said receptacle means to said power supply means in a plurality of spacial orientations, with each of said spacial orientations causing a different one of said plurality of said power supply circuits to be electrically coupled to said receptacle means, wherein said receptacle circuit means comprises a plurality of electrical receptacle connector sets, each of said receptacle connector sets adapted to be electrically and selectively coupled to said power supply means, a first receptacle connector set extending outwardly on a first end of said outlet receptacle block; and a second receptacle connector set extending outwardly on a second end of said outlet receptacle block.

2. A multiple circuit receptacle system in accordance with claim 1, wherein:

said outlet receptacle block comprises a first side and a second side, said second side facing in an opposing direction to said first side; and said receptacle circuit means comprises at least a first outlet receptacle on said first side of said outlet receptacle block, and at least a second outlet receptacle on said second side of said outlet receptacle block.

* * * * *